(12) United States Patent
Lee et al.

(10) Patent No.: US 11,124,220 B2
(45) Date of Patent: Sep. 21, 2021

(54) STEER-BY-WIRE TYPE STEERING APPARATUS

(71) Applicant: MANDO CORPORATION, Gyeonggi-do (KR)

(72) Inventors: InHwan Lee, Gyeonggi-do (KR); Hyoung Woo Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 316 days.

(21) Appl. No.: 16/205,207

(22) Filed: Nov. 29, 2018

(65) Prior Publication Data

US 2019/0185050 A1 Jun. 20, 2019

(30) Foreign Application Priority Data

Dec. 19, 2017 (KR) .......................... 10-2017-0174865
Apr. 4, 2018 (KR) .......................... 10-2018-0039044

(51) Int. Cl.
| | | |
|---|---|---|
| *B62D 5/00* | (2006.01) | |
| *B62D 6/00* | (2006.01) | |
| *B62D 5/04* | (2006.01) | |
| *F16H 7/02* | (2006.01) | |

(52) U.S. Cl.
CPC ........... *B62D 5/006* (2013.01); *B62D 5/0421* (2013.01); *B62D 5/0469* (2013.01); *B62D 6/008* (2013.01); *F16H 7/02* (2013.01)

(58) Field of Classification Search
CPC .... B62D 5/006; B62D 5/0421; B62D 5/0469; B62D 6/008; F16H 7/02

USPC .......................................................... 180/402
See application file for complete search history.

(56) References Cited

U.S. PATENT DOCUMENTS

| 3,211,248 | A | * | 10/1965 | Quayle | ................ | B60K 17/043 |
| | | | | | | 180/13 |
| 2004/0011585 | A1 | * | 1/2004 | Menjak | .................. | B62D 5/006 |
| | | | | | | 180/402 |
| 2012/0205183 | A1 | * | 8/2012 | Rombold | ............. | B62D 5/0448 |
| | | | | | | 180/402 |

FOREIGN PATENT DOCUMENTS

| JP | 2006-240559 | 9/2006 |
| JP | 2007-106139 | 4/2007 |
| WO | 2014/068633 | 5/2014 |

OTHER PUBLICATIONS

Office Action dated Feb. 7, 2019 for Korean Patent Application No. 10-2017-0174865 and its English machine translation by Google Translate.

* cited by examiner

*Primary Examiner* — Minnah L Seoh
*Assistant Examiner* — Felicia L. Brittman
(74) *Attorney, Agent, or Firm* — Ladas & Parry, LLP

(57) ABSTRACT

The present disclosure relates to a steer-by-wire type steering apparatus. According to present embodiments, in the steer-by-wire type steering apparatus, when a driver generates a larger steering torque than a reaction torque of a reaction motor in a steering shaft, rotation of the steering shaft can be prevented.

8 Claims, 14 Drawing Sheets

STEER-BY-WIRE TYPE STEERING APPARATUS

CROSS REFERENCE TO RELATED APPLICATION

This application claims priority to Korean Patent Application No. 10-2017-0174865, filed on Dec. 19, 2017, and Korean Patent Application No. 10-2018-0039044, filed on Apr. 4, 2018, which are hereby incorporated by reference for all purposes as if fully set forth herein.

BACKGROUND

1. Technical Field

Some embodiments of the present disclosure may relate to a steer-by-wire type steering apparatus. More particularly, certain exemplary embodiments of present disclosure may relate to a steer-by-wire type steering apparatus that is capable of preventing rotation of a steering shaft when a driver generates a larger steering torque than a reaction torque of a reaction motor in the steering shaft.

2. Description of Related Art

In general, in a steering apparatus of a vehicle, power steering has been developed and applied to provide convenience of a driving operation by assisting in an operation force of a driver's steering wheel, and examples of power steering include hydraulic type power steering using a hydraulic pressure, electrically-powered hydraulic type power steering that simultaneously uses the hydraulic pressure and an electrical power of a motor, and electrically-powered type power steering using only an electrical power of the motor.

Recently, a steer-by-wire (SBW) type steering apparatus in which steering of the vehicle is performed using an electric motor such as a motor, by which a mechanical connection apparatus, such as a steering column, between the steering wheel and a wheel, a universal joint, or a pinion shaft is removed instead, has been developed and applied.

However, because there is no mechanical connection between a steering shaft and the wheel in such a steer-by-wire type steering apparatus, rotation of the driver's steering wheel is unlimited so that the driver's steering sense may be degraded.

That is, when rotation of the wheels reaches a maximum point (when, in a steering apparatus according to the related art, the steering wheel or wheels are in a full-turn state) or when the wheels collide with a curbstone of a road and cannot be rotated any more, the necessity for not rotating the steering shaft any more and providing such information to the driver has emerged.

SUMMARY

In this background, the present disclosure is to provide a steer-by-wire type steering apparatus that is capable of preventing rotation of a steering shaft when a driver generates a larger steering torque than a reaction torque of a reaction motor in the steering shaft.

It should be noted that objects of the present disclosure are not limited to the above-mentioned object, and other objects of the present disclosure will be understood by those skilled in the art from the following description.

To solve the foregoing problem, an embodiment provides a steer-by-wire type steering apparatus including a first pulley coupled to a steering shaft, a second pulley connected to the first pulley via a belt and coupled to a shaft of a reaction motor, an engaging member coupled to the shaft of the reaction motor and having engaging grooves formed in an outer circumferential surface thereof, a pair of rotation-preventing members each having one end coupled to a housing, in which the first pulley and the second pulley are embedded, via a hinge shaft to rotate and the other end having engaging protrusions supported in the engaging grooves, the pair of rotation-preventing members supported in engaging grooves of one side and the other side of the outer circumferential surface of the engaging member, and a cam member disposed between one ends of the pair of rotation-preventing members, being rotated while being coupled to a shaft of a driving motor and rotating each of the rotation-preventing members around the hinge shaft.

An embodiment provides a steer-by-wire type steering apparatus including a first member coupled to one side of a steering shaft and a shaft of a reaction motor and having fixing grooves formed in an outer circumferential surface of one side end thereof in an axial direction, a second member having fixing protrusions corresponding to the fixing grooves, coupled to an outside of the first member and having first support grooves formed in one side end of the second member in a circumferential direction and spaced apart from one another, a third member coupled to the other side of the steering shaft and the shaft of the reaction motor and having second support grooves at positions corresponding to the first support grooves, a ball member supported and inserted in the first support grooves and the second support grooves, and a rotation-preventing member formed in a ring form that is fixed to a housing in which the steering shaft is embedded, having engaging grooves formed in an inner circumferential surface thereof in the axial direction and coupled to outer circumferential surfaces of the second member and the third member.

According to the present embodiments, in a steer-by-wire type steering apparatus, when a driver generates a larger steering torque than a reaction torque of a reaction motor in a steering shaft, rotation of the steering shaft can be prevented.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
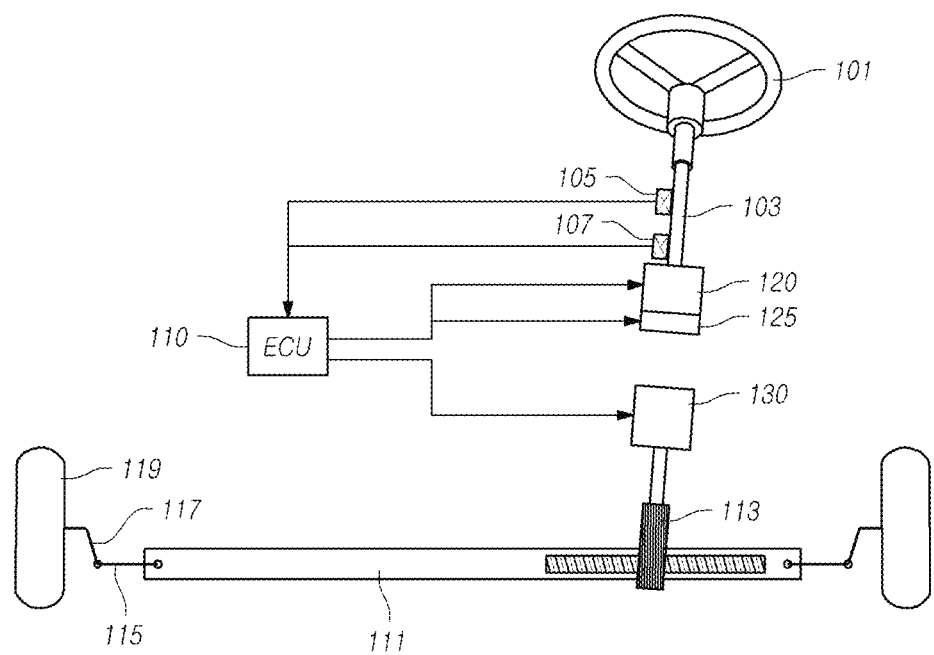
FIG. 1 is a view for schematically illustrating a steer-by-wire type steering apparatus according to the present embodiments.
Figure 2:
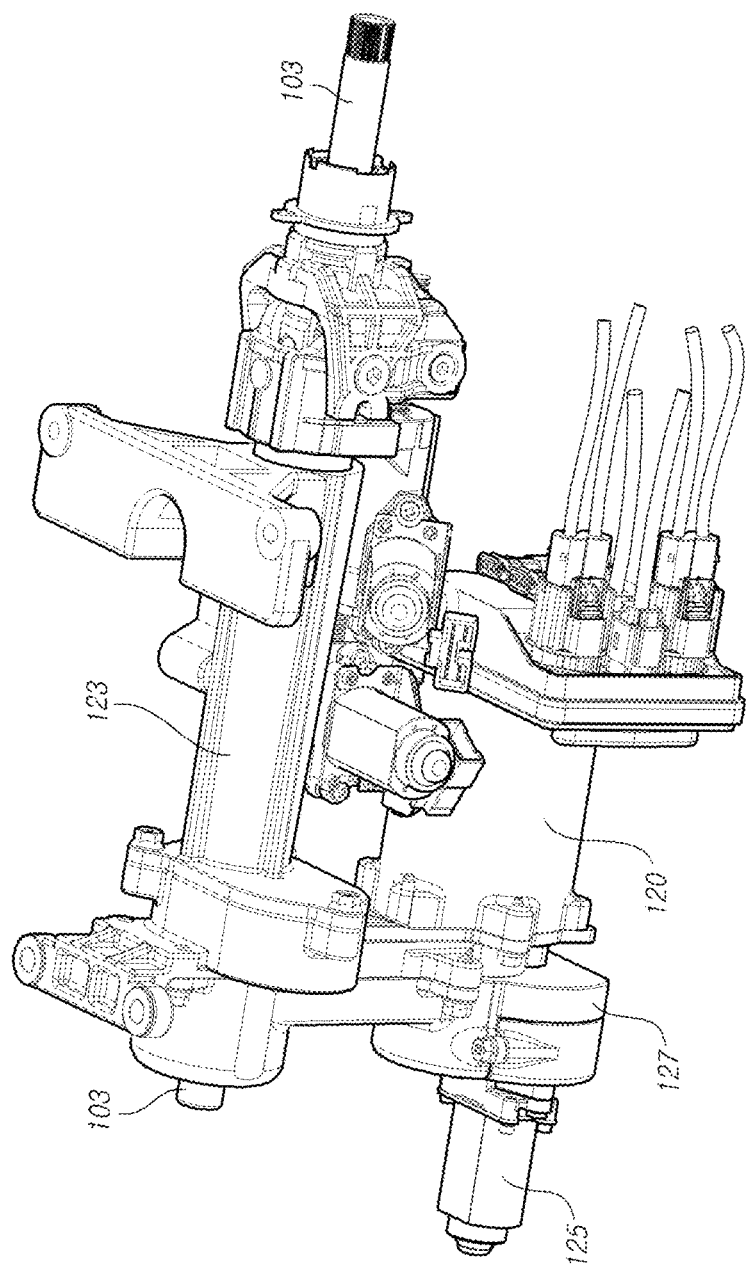
FIG. 2 is a perspective view of a part of the steer-by-wire type steering apparatus according to the present embodiments.
Figure 3:
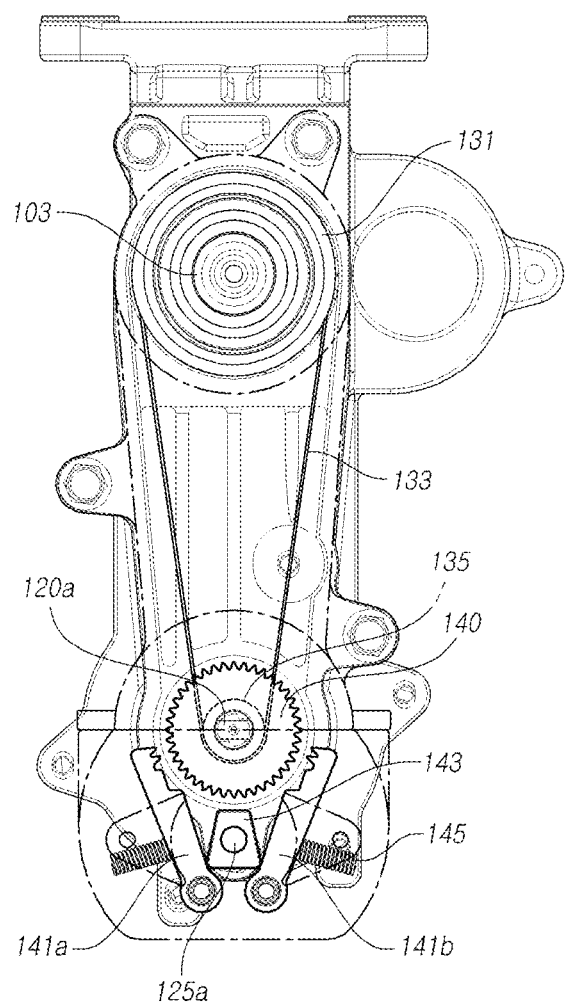
FIGS. 3 through 7 are front views of a part of the steer-by-wire type steering apparatus according to the present embodiments.
Figure 4:
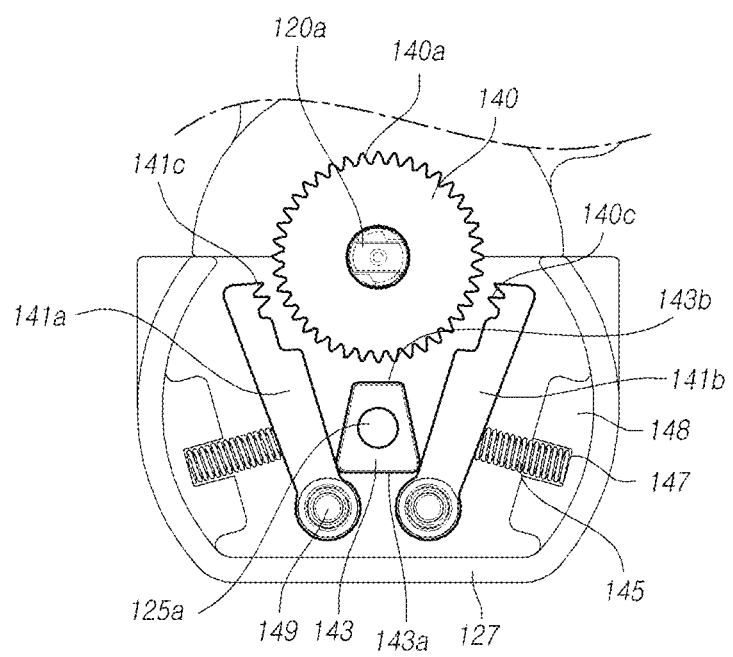

Hereinafter, embodiments of the present disclosure will be described in detail with reference to the accompanying drawings. In adding reference numerals to elements in each drawing, the same elements will be designated by the same reference numerals, if possible, although the elements are shown in different drawings. Further, in the following description of the present disclosure, a detailed description of known functions and configurations incorporated herein will be omitted when it is determined that the description may make the subject matter of the present disclosure rather unclear.

In addition, when describing elements of the present embodiments, the terms, such as first, second, A, B, (a), and (b), may be used. These terms are only used to distinguish one element from another element, and the essence, order, or sequence of a corresponding element is not limited by these terms. When it is described that an element is "connected to," "coupled to," or "joined to" another element, it will be understood that the element may be directly connected to or jointed to another element, but still another element may also be "connected," "coupled," or "jointed" between the two elements.

First, referring to FIGS. 1 through 7, a steer-by-wire type steering apparatus according to the present embodiments includes a first pulley 131 coupled to a steering shaft 103, a second pulley 135 connected to the first pulley 131 via a belt 133 and coupled to a shaft 120a of a reaction motor 120, an engaging member 140 coupled to the shaft 120a of the reaction motor 120 and having engaging grooves 140a formed in an outer circumferential surface thereof, a pair of rotation-preventing members 141a and 141b each having one end fixed to a housing 127, in which the first pulley 131 and the second pulley 135 are embedded, via a hinge shaft 149 to rotate and the other end in which engaging protrusions 141c supported in the engaging grooves 140a are formed, the pair of rotation-preventing members 141a and 141b being supported in the engaging grooves 140a at each of one side and the other side of the outer circumferential surface of the engaging member 140, and a cam member 143 disposed between one ends of the rotation-preventing members 141a and 141b, being rotated while being coupled to a shaft 125a of a driving motor 125 and rotating each of the rotation-preventing members 141a and 141b around the hinge shaft 149.

In the steer-by-wire type steering apparatus according to the present embodiments, an angle sensor 105 and a torque sensor 107 are coupled to one side of the steering shaft 103 connected to a steering wheel 101, and when a driver operates the steering wheel 101, the angle sensor 105 and the torque sensor 107 that sense the driver's operation transmit electrical signals to an electronic control unit (ECU) 110 so that the reaction motor 120 and a pinion shaft motor 130 may operate.

The ECU 110 controls the reaction motor 120 and the pinion shaft motor 130 based on electrical signals transmitted from the angle sensor 105 and the torque sensor 107 and electrical signals transmitted from several sensors mounted on a car.

The pinion shaft motor 130 slides a rack bar 111 connected to a pinion shaft 113 to perform steering of both-side wheels 119 using a tie rod 115 and a knuckle arm 117, and the reaction motor 120 generates a steering reaction sense in an opposite direction when the driver operates the steering wheel 101, or performs steering of the steering shaft 103 when autonomous driving is performed.

However, in the drawings of the present embodiments, for convenience of explanation, the angle sensor 105 and the torque sensor 107 are provided in the steering shaft 103. However, a motor position sensor, a variety of radar, and a camera image sensor for transmitting steering information to the ECU 110 may be provided, obviously, and hereinafter, a detailed description thereof will be omitted.

Because, in the steer-by-wire type steering apparatus, the steering shaft 103 and the pinion shaft 113 are not mechanically connected to each other, the driver's rotation of the steering wheel 101 is unlimited so that mechanical limitations in which rotation is stopped at an arbitrary angle, are required.

That is, when rotation of the wheels 119 reaches a maximum point (when, in a steering apparatus according to the related art, the steering wheel 101 or the wheels 119 are in a full-turn state) or when the wheels 119 collide with a curbstone of a road and cannot be rotated any more, a reaction torque is output from the reaction motor 120 to the maximum. Thus, the steering shaft 103 is not rotated any more so that rotation of the steering shaft 103 is prevented to give this information to the driver.

A driving motor 125 mechanically connected to the steering shaft 103 is provided so as to prevent rotation of the steering shaft 103. When a steering torque that is greater than or equal to a maximum reaction torque of the reaction motor 120 is generated, the rotation-preventing members 141a and 141b operate so that the rotation of the steering shaft 103 is stopped.

First, the steering shaft 103 coupled to the steering wheel 101 is provided in a steering column 123 fixed to a body of the car, and the reaction motor 120 for providing a steering reaction sense to the steering shaft 103, and the driving motor 125 that operates to stop rotation of the steering shaft 103 when a steering torque that is greater than or equal to the maximum reaction torque of the reaction motor 120 is generated in the steering shaft 103, are provided at both sides of the steering column 123 via the housing 127.

The first pulley 131 is coupled to the steering shaft 103, and the second pulley 135 is coupled to the shaft 120a of the reaction motor 120, and the first pulley 131 and the second pulley 135 are connected to each other via the belt 133.

Thus, when the driver operates the steering wheel 101, the ECU 110 operates the reaction motor 120 based on signal values detected by the torque sensor 107 and the angle sensor 105 so as to generate a reaction torque in an opposite direction to a rotation direction of the steering shaft 103.

Also, the engaging member 140 in which the engaging grooves 140a are consecutively formed in the outer circumferential surface thereof, is coupled to the shaft 120a of the reaction motor 120 and is rotated together with the shaft 120a of the reaction motor 120, and the pair of rotation-preventing members 141a and 141b that limit rotation of the engaging member 140 are provided.

Here, one ends of the rotation-preventing members 141a and 141b are coupled to the housing 127 in which the first pulley 131 and the second pulley 135 are embedded, via the hinge shaft 149, and the engaging protrusions 141*c* supported in the engaging grooves 140*a* of the engaging member 140 are formed in the other ends of the rotation-preventing members 141*a* and 141*b*.

Also, the other ends of the rotation-preventing members 141*a* and 141*b* are supported in the engaging grooves 140*a* of one side and the other side of the outer circumferential surface of the engaging member 140, respectively.

The cam member 143 for rotating each of the rotation-preventing members 141*a* and 141*b* based on each hinge shaft 149 is disposed at one end of each of the rotation-preventing members 141*a* and 141*b*. The cam member 143 is coupled to the shaft 125*a* of the driving motor 125 and is rotated.

Also, an elastic member 145 for elastically supporting the rotation-preventing members 141*a* and 141*b* using the engaging member 140 is coupled to an inner circumferential surface of the housing 127. Thus, as long as the cam member 143 does not spread the rotation-preventing members 141*a* and 141*b* bilaterally, the cam member 143 is supported inward based on the hinge shaft 149.

Support grooves 147 in which the elastic member 145 is inserted and supported, are formed in the inner circumferential surface of the housing 127. The support grooves 147 may be formed in a protruding end 148 that protrudes from the inner circumferential surface of the housing 127.

The cam member 143 may be formed in a trapezoidal form having a predetermined thickness, and when both ends of a long side 143*a* of two facing and parallel sides of the trapezoidal form are supported in one end of each of the rotation-preventing members 141*a* and 141*b*, each of the rotation-preventing members 141*a* and 141*b* is spread bilaterally based on the hinge shaft 149. In this case, the elastic member 145 is compressed, and the engaging protrusions 141*c* are moved to positions deviated from the engaging grooves 140*a*.

Figure 5:
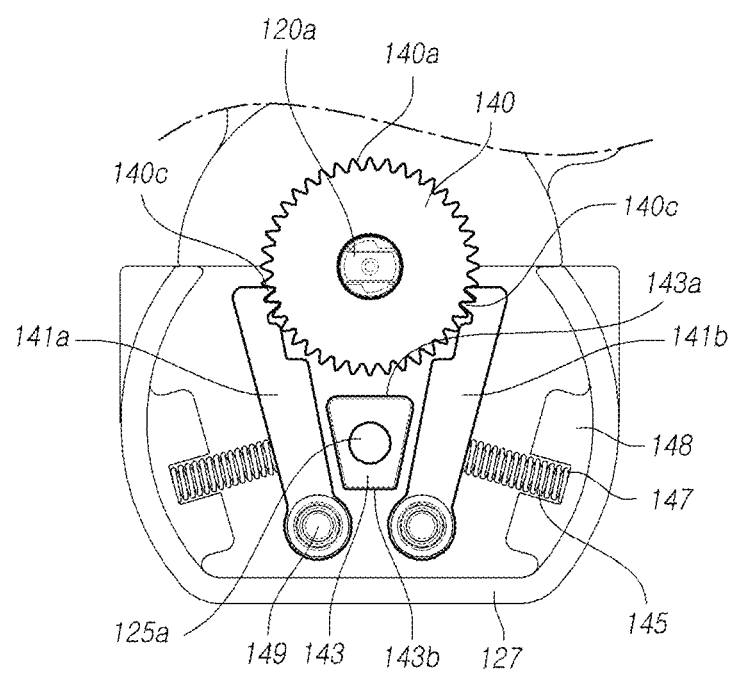

Also, when a short side 143*b* of two facing and parallel sides of the cam member 143 is placed at one end of each of the rotation-preventing members 141*a* and 141*b*, as shown in FIG. 5, the elastic member 145 is restored, and the engaging protrusions 141*c* are moved to positions at which the engaging protrusions are inserted into the engaging grooves 140*a*.

That is, when both sides of the long side 143*a* of the cam member 143 are supported by the rotation-preventing members 141*a* and 141*b*, the elastic member 145 is compressed, and the engaging protrusions 141*c* are moved to positions deviated from the engaging grooves 140*a*, and when both sides of the long side 143*a* of the cam member 143 are not supported by the rotation-preventing members 141*a* and 141*b*, the elastic member 145 is restored, and the engaging protrusions 141*c* are inserted into the engaging grooves 140*a*.

Thus, when the engaging protrusions 141*c* are supported in the engaging grooves 140*a*, rotation of the steering shaft 103 is prevented, and when the engaging protrusions 141*c* are moved to positions deviated from the engaging grooves 140*a*, the rotation of the steering shaft 103 is possible.

The steer-by-wire type steering apparatus according to the present embodiments may further include a torque sensor 107 for measuring a steering torque value generated in the steering shaft 103 and an electronic control device (ECU) 110 that calculates a reaction torque value of the steering shaft 103 based on the steering torque value measured by the torque sensor 107, transmits the calculated reaction torque value to the reaction motor 120, and compares the steering torque value with a set maximum reaction torque value to determine whether to operate the driving motor 125.

Here, when the steering torque value is smaller than the set maximum reaction torque value, the ECU 110 operates the driving motor 125 so that both ends of the long side 143*a* of two facing and parallel sides of the cam member 143 are supported by one end of each of the rotation-preventing members 141*a* and 141*b* and the engaging protrusions 141*c* are moved to positions deviated from the engaging grooves 140*a*.

Also, when the steering torque value is greater than the set maximum reaction torque value, the ECU 110 operates the driving motor 125 so that one end of the long side 143*a* of two facing and parallel sides of the cam member 143 is supported by one end of the rotation-preventing member 141*b* (see FIG. 6) and 141*a* (see FIG. 7) for supporting in a direction toward a reaction torque and thus only the rotation-preventing members 141*b* (see FIG. 6) and 141*a* (FIG. 7) for supporting the direction toward the reaction torque may be moved to positions deviated from the engaging grooves 140*a*.

That is, when the steering torque value in one direction, for example, in a left-turn direction is greater than the maximum reaction torque value, only rotation of the steering shaft 103 in the left-turn direction is prevented, and rotation of the steering shaft 103 in a right-turn direction that is opposite to the left-turn direction is possible.

Figure 6:
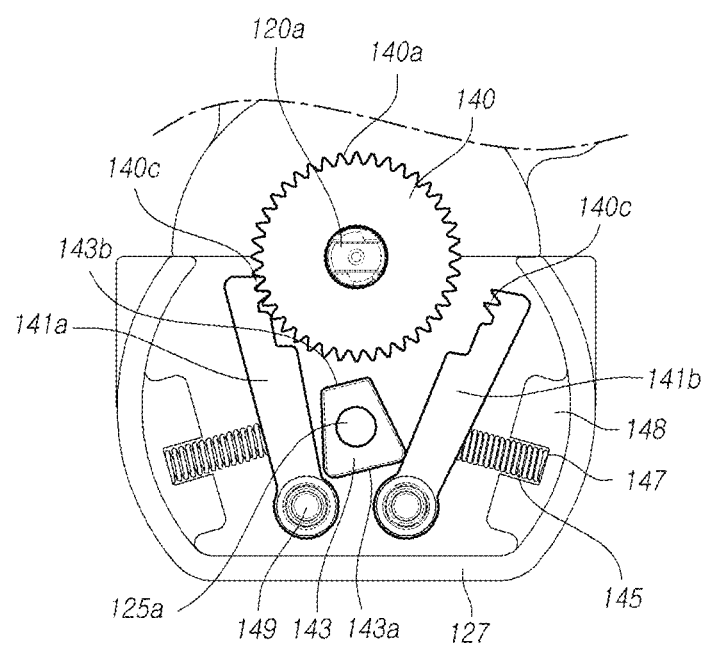

This will be described based on FIGS. 6 and 7. First, FIG. 6 illustrates the case where the steering torque value in the left-turn direction is greater than the maximum reaction torque value, and the case means that left-turn of the engaging member 140 that is a counterclockwise direction in the drawings is not possible and right-turn of the engaging member 140 that is a clockwise direction in the drawings is possible. Here, the left-turn of the engaging member 140 which is impossible means that left-turn of the steering shaft 103 connected to the shaft 120*a* of the reaction motor 120 via the first pulley 131 and the second pulley 135 is not possible, either.

That is, because FIG. 6 illustrates the case where the driver generates a steering torque in the left-turn direction, the reaction torque is generated in the right-turn direction that is the clockwise direction in the drawings, and only the rotation-preventing member 141*b* (see FIG. 6) for supporting a reaction torque direction so that the right-turn of the engaging member 140 is possible, is moved to a position deviated from the engaging grooves 140*a*.

Figure 7:
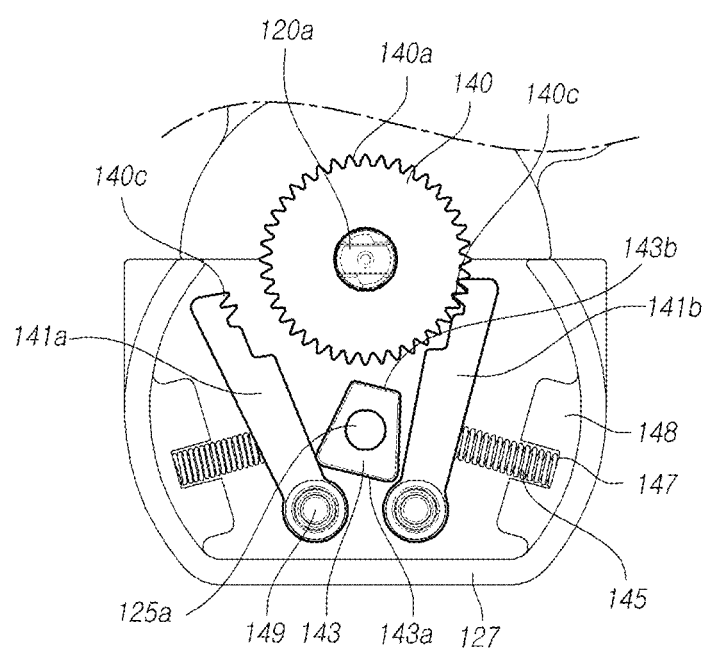
Figure 8:
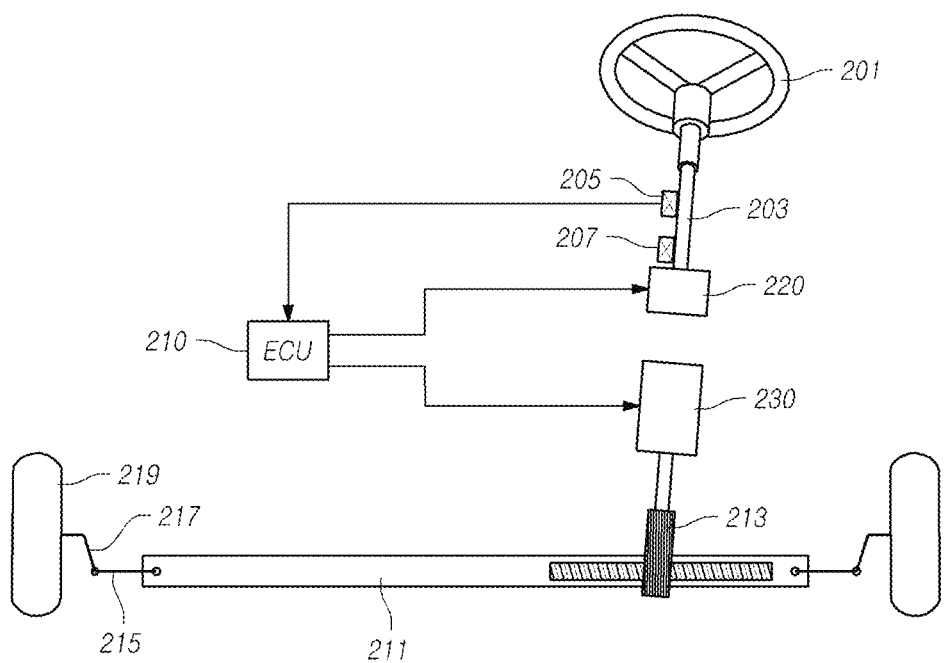
FIG. 8 is a view for schematically illustrating a steer-by-wire type steering apparatus according to other embodiments.
Figure 9:
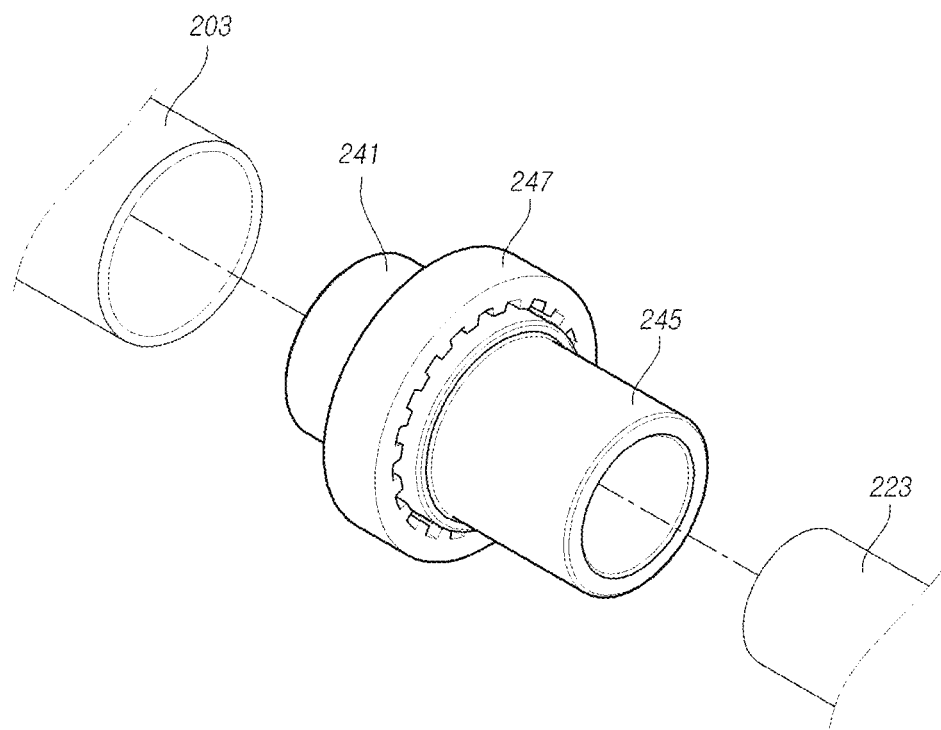
FIG. 9 is a perspective view of a part of the steer-by-wire type steering apparatus according to other embodiments.

Contrary to this, because FIG. 7 illustrates the case where the steering torque value in a right-turn direction is greater than the maximum reaction torque value, right-turn of the engaging member 140 that is a clockwise direction in the drawings is not possible, and left-turn of the engaging member 140 that is a counterclockwise direction in the drawings is possible. Here, the right-turn of the engaging member 140 which is impossible means that right-turn of the steering shaft 103 connected to the shaft 120*a* of the reaction motor 120 via the first pulley 131 and the second pulley 135 is not possible, either.

Here, because FIG. 7 illustrates the case where the driver generates a steering torque in the right-turn direction, the reaction torque is generated in the left-turn direction that is the counterclockwise direction in the drawings, and only the rotation-preventing member 141*a* (see FIG. 7) for supporting the reaction torque direction so that the left-turn of the engaging member 140 is possible, is moved to a position deviated from the engaging grooves 140*a*.

That is, only rotation of the steering shaft 103 in one side direction is not possible depending on whether the ECU 110 operates the driving motor 125 to rotate the cam member 143 in which direction.

Meanwhile, referring to FIGS. 8 through 14, a steer-by-wire type steering apparatus according to the present embodiments includes a first member 241 coupled to one side of a steering shaft 203 and a shaft 223 of a reaction motor and having fixing grooves 241a formed in an outer circumferential surface of one side end thereof in an axial direction, a second member 243 having fixing protrusions 243a corresponding to the fixing grooves 241a therein, coupled to an outside of the first member 241 and having first support grooves 243b formed in one side end of the second member 243 in a circumferential direction and spaced apart from one another, a third member 245 coupled to the other side of the steering shaft 203 and the shaft 223 of the reaction motor and having second support grooves 245b at positions corresponding to the first support grooves 243b, a ball member 251 supported and inserted in the first support grooves 243b and the second support grooves 245b, and a rotation-preventing member 247 formed in a ring form that is fixed to a housing in which the steering shaft 203 is embedded, having engaging grooves 247a formed in an inner circumferential surface thereof in the axial direction and coupled to outer circumferential surfaces of the second member 243 and the third member 245.

In the steer-by-wire type steering apparatus according to the present embodiments, an angle sensor 205 and a torque sensor 207 are coupled to one side of the steering shaft 203 connected to a steering wheel 201, and when a driver operates the steering wheel 201, the angle sensor 205 and the torque sensor 207 that sense the driver's operation transmits electrical signals to an ECU 210 so that a reaction motor 220 and a pinion shaft motor 230 may operate.

The ECU 210 controls the reaction motor 220 and the pinion shaft motor 230 based on the electrical signals transmitted from the angle sensor 205 and the torque sensor 207 and electrical signals transmitted from several sensors mounted on the car.

The pinion shaft motor 230 slides a rack bar 211 connected to a pinion shaft 213 to perform steering of both-side wheels 219 using a tie rod 215 and a knuckle arm 217. The reaction motor 220 generates a steering reaction sense in an opposite direction when the driver operates the steering wheel 201, or performs steering of the steering shaft 203 when autonomous driving is performed, and the shaft 223 of the reaction motor is coaxially connected to the steering shaft 203.

The first member 241 is coupled to one side of the steering shaft 203 and the shaft 223 of the reaction motor so as to prevent rotation of the steering shaft 203, and the third member 245 is coupled to the other side thereof, and the second member 243 and the ball member 251 are coupled between the first member 241 and the third member 245. When a steering shaft torque that is greater than or equal to a reaction torque is generated in the shaft 223 of the reaction motor, the ball member 251 is supported in the engaging grooves 247a of the rotation-preventing member 247 so that rotation of the steering shaft 203 is stopped.

However, for convenience of explanation, an example, in which the first member 241 is coupled to the steering shaft 203 and the third member 245 is coupled to the shaft 223 of the reaction motor, is illustrated to be described.

The fixing grooves 241a formed in the axial direction are formed in an outer circumferential surface of one side end of the first member 241 coupled to the steering shaft 203, and the fixing protrusions 243a of the second member 243 are coupled to the fixing grooves 241a so that the first member 241 and the second member 243 may be rotated as a single body.

The second member 243 is formed in a ring form, and the fixing protrusions 243a corresponding to the fixing grooves 241a of the first member 241 are axially formed in an inner circumferential surface of the second member 243 and coupled to the outside of the first member 241, and the first support grooves 243b are formed in one side end of the second member 243 and are spaced apart from one another in the circumferential direction.

The second support grooves 245b are formed in positions of the third member 245 coupled to the shaft 223 of the reaction motor, which correspond to positions of the first support grooves 243b of the second member 243.

Figure 10:
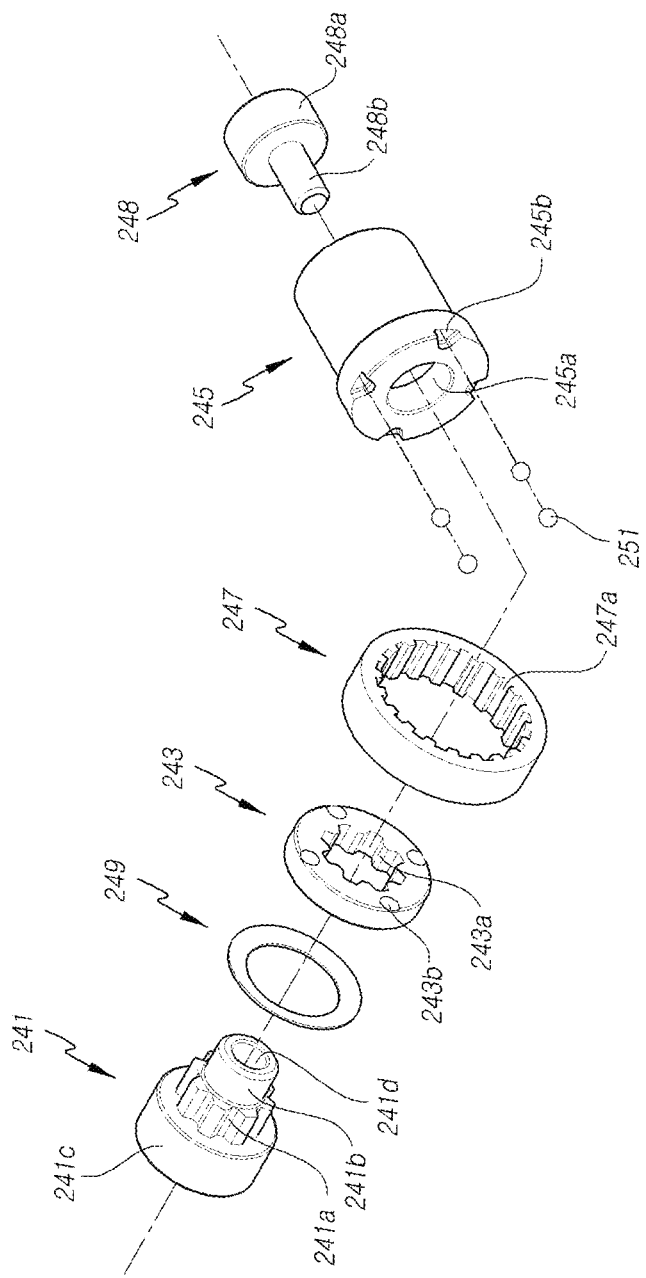
FIG. 10 is an exploded perspective view of a part of the steer-by-wire type steering apparatus according to other embodiments.
Figure 11:
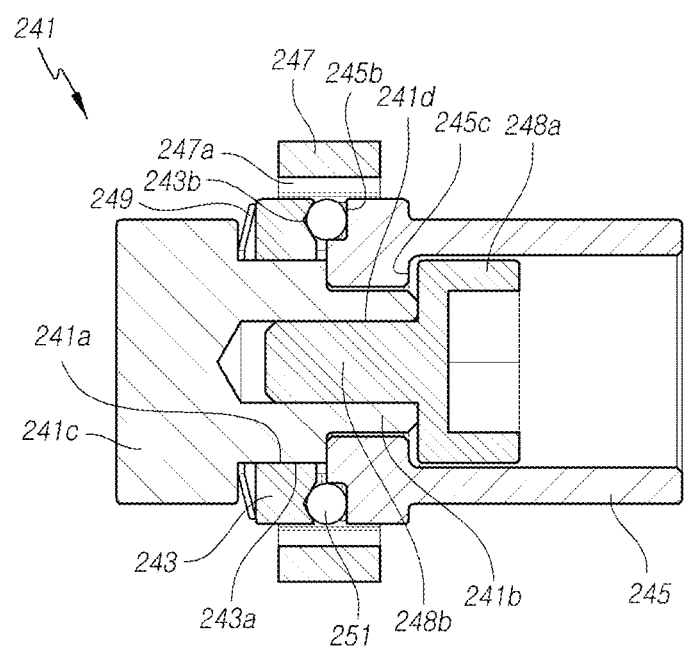
FIG. 11 is a cross-sectional view of a part of the steer-by-wire type steering apparatus according to other embodiments.

Here, the first support grooves 243b are formed in a conical shape that is circularly in line contact with the ball member 251, as shown in FIGS. 10 and 11.

Both sides of the second support grooves 245b are inclined so that widths thereof gradually increase from a surface facing one side end of the second member 243 to a radial outer circumferential surface of the second member 243, and the ball member 251 is supported and inserted in the first support grooves 243b of the second member 243 and the second support grooves 245b of the third member 245.

The rotation-preventing member 247 formed in a ring form and having the engaging grooves 247a formed in the inner circumferential surface thereof in the axial direction, is coupled to the outer circumferential surfaces of the second member 243 and the third member 245.

Here, although not shown in the drawings, the rotation-preventing member 247 is fixed to the housing in which the steering shaft 203 is embedded, or a body of the car and is not rotated regardless of rotation of the first member 241, the second member 243, and the third member 245 and is fixed.

The first member 241 has an extension part 241b that is formed at one side end of the fixing grooves 241a based on a center part in which the fixing grooves 241a are formed, and extends in the axial direction, and a large-diameter part 241c formed at the other side end of the fixing grooves 241a and having an enlarged diameter.

An elastic member 249 is provided between the large-diameter part 241c of the first member 241 and the second member 243 and applies an elastic force in the axial direction so as to support the ball member 251 using the elastic force of the elastic member 249.

Also, a coupling part 241d having a screw part therein is provided at an inner circumferential surface of the extension part 241b of the first member 241, and the third member 245 has a through hole 245a in its inside so that a body part 248b of a fastening member 248 is coupled to the coupling part 241d of the first member 241 through the through hole 245a.

Also, an engaging step 245c is formed at one side of the through hole 245a so that a head part 248a of the fastening member 248 is supported by the engaging step 245c and deviation of the fastening member 248 is prevented.

Because the fastening member 248 couples the first member 241 to the third member 245, thereby adjusting a distance therebetween so that the elastic force of the elastic member 249 may be adjusted with a fastening amount of the fastening member 248.

Thus, the first member 241, the second member 243, and the third member 245 are assembled to be operable on the same axis so that the elastic force of the elastic member 249 is set.

Here, two or more first support grooves 243b of the second member 243 and two or more second support grooves 245b of the third member 245 are spaced apart from one another in the circumferential direction. In the drawings, three first support grooves 243b and three second support grooves 245b are provided. In this case, the first support grooves 243b and the second support grooves 245b are disposed in the circumferential direction at equal intervals so that the ball member 251 is maintained in the axial direction with an equal support force.

In the steer-by-wire type steering apparatus according to the present embodiments, when rotation of the wheels 219 reaches a maximum point, or when the wheels 219 collide with a curbstone of a road and cannot be rotated any more, as described above, rotation of the steering shaft 203 is prevented.

That is, in a general steering condition, the elastic member 249 is maintained in a compressed state by a predetermined amount due to the fastening member 248, and a rotation torque is transmitted from the steering shaft 203 to the shaft 223 of the reaction motor through the first member 241, the second member 243, and the third member 245.

Figure 12:
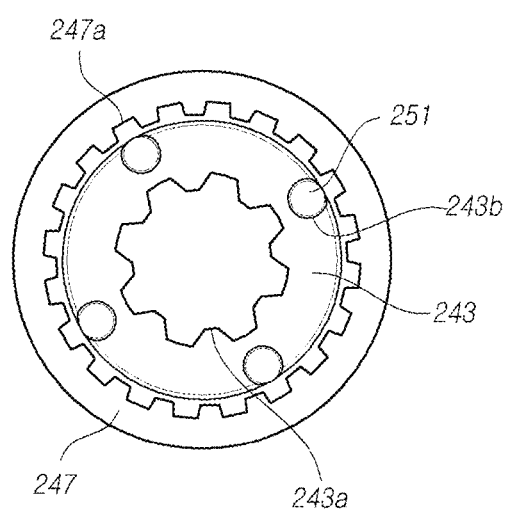
FIGS. 12 through 14 are front views of a part of the steer-by-wire type steering apparatus according to other embodiments.
Figure 13:
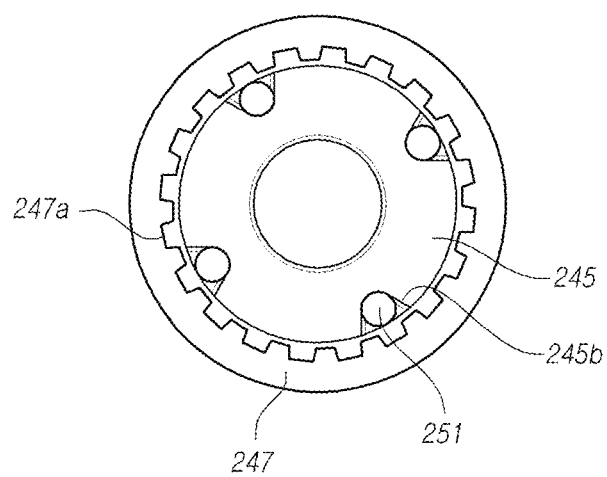
Figure 14:
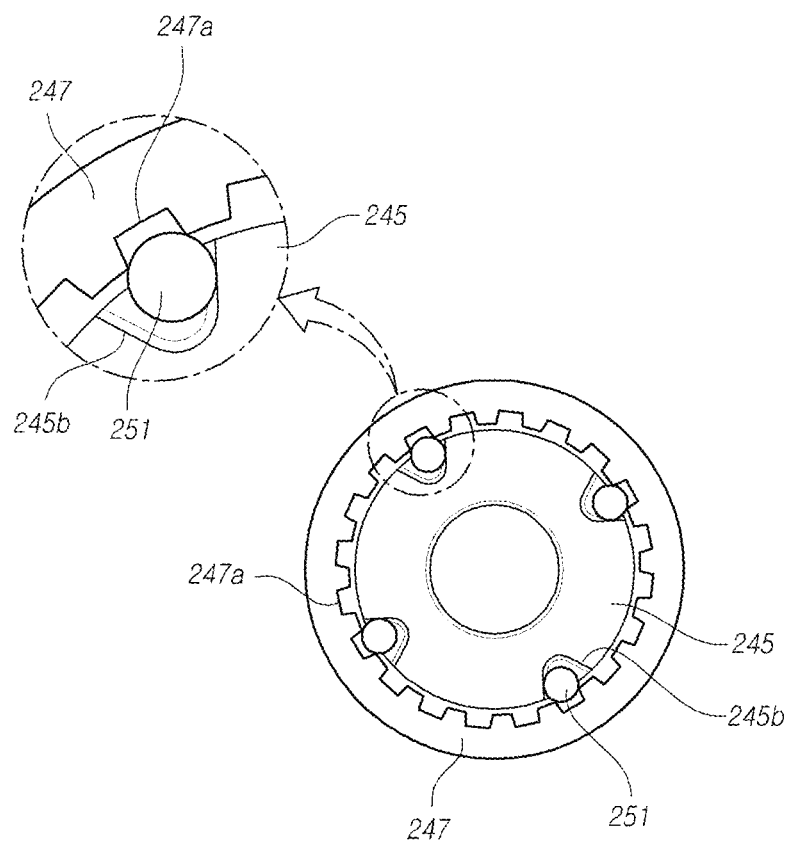

In this case, the ball member 251 is placed only in the first support grooves 243b and the second support grooves 245b, as shown in FIGS. 12 and 13. When rotation of the steering shaft 203 should be prevented, as described above, i.e., when an excessive rotation torque that is greater than or equal to the reaction torque of the shaft 223 of the reaction motor is transmitted from the steering shaft 203, due to a rotational force of the second member 243, the ball member 251 is moved outward in a radial direction along both sides of the second support grooves 245b and is supported in the engaging grooves 247a of the rotation-preventing member 247 so that further rotation is limited.

That is, when the rotation torque transmitted from the steering shaft 203 to the second member 243 is excessive, the ball member 251 is moved outward in the radial direction along both inclined surfaces of the second support grooves 245b due to a component force of a force moving in the circumferential direction, and simultaneously, as the ball member 251 is moved from a center part of the first support grooves 243b outside, the second member 243 is moved in the axial direction by a difference in an axial movement amount of the ball member 251 and the elastic member 249 is further compressed.

Contrary to this, when the rotation torque is reduced, due to a restoration force of the elastic member 249, the second member 243 is moved in the axial direction, and the ball member 251 is moved to the center part of the first support grooves 243b and simultaneously, the ball member 251 is moved to a position deviated from the engaging grooves 247a and is returned to the second support grooves 245b.

Thus, when the elastic force of the elastic member 249 is set according to a design target value and a rotational force that is greater than or equal to a predetermined rotation torque value is transmitted, the second member 243 is rotated and is moved in the axial direction due to the elastic force of the elastic member 249 and radial movement of the ball member 251 is performed so that rotation of the steering shaft 203 may be prevented.

As described above, according to the present embodiments, when a driver generates a larger steering torque than a reaction torque of a reaction motor in a steering shaft in a steer-by-wire type steering apparatus, rotation of the steering shaft can be prevented.

As described above, although all elements that constitute the present embodiments are described as being coupled as one or operating while being coupled to one another, the present embodiments are not necessarily limited to these embodiments. That is, when all elements are within the scope of the purposes of the embodiments, all elements may also operate while being selectively coupled as one or more.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited to the embodiments. The scope of the present disclosure shall be construed on the basis of the accompanying claims in such a manner that all of the technical ideas included within the scope equivalent to the claims belong to the present disclosure.

What is claimed is:

1. A steering apparatus comprising:
   a first pulley coupled to a steering shaft;
   a second pulley connected to the first pulley via a belt and coupled to a shaft of a reaction motor;
   an engaging member coupled to the shaft of the reaction motor and including engaging grooves formed in an outer surface of the engaging member;
   a plurality of rotation-preventing members, each of the rotation-prevention members comprising one part moveably coupled to a housing, covering at least a portion of the first and second pulleys, via a hinge shaft and an other part comprising engaging protrusions engageable in the engaging grooves of the engaging member, each of the rotation-preventing members engageable with different portions of the outer surface of the engaging member; and
   a cam member disposed between the rotation-preventing members, coupled to a shaft of a driving motor, and configured to be rotatable to move the rotation-preventing members.

2. The steering apparatus of claim 1, further comprising elastic members coupled to an inner surface of the housing, the elastic members elastically supporting the rotation-preventing members.

3. The steering apparatus of claim 2, wherein support grooves are formed in the inner surface of the housing and the elastic members are inserted in the support grooves.

4. The steering apparatus of claim 2, wherein:
   the cam member has a trapezoidal shape comprising a long side and a short side parallel each other, and at least one end of the long side of the cam member, when contacting at least one of the rotation-preventing members, moves the at least one of the rotation-preventing members so that at least one of the elastic members is compressed and at least one of the engaging protrusions is disengaged from the engaging grooves.

5. The steering apparatus of claim 4, wherein, as the short side of the cam member moves toward the one part of the rotation-preventing members movably coupled to the housing, the elastic member is restored and the engaging protrusions are engaged with the engaging grooves.

6. The steering apparatus of claim 4, further comprising:
   a torque sensor configured to measure steering torque generated by the steering shaft; and
   an electronic control unit (ECU) configured to calculate a reaction torque value of the steering shaft based on the steering torque measured by the torque sensor, to output the calculated reaction torque value to the reaction motor, and to compare the steering torque with a set maximum reaction torque value to determine whether to operate the driving motor.

7. The steering apparatus of claim 6, wherein the ECU is configured to, when the steering torque measured by the torque sensor is smaller than the maximum reaction torque value, operate the driving motor so that both ends of the long side of the cam member contact respectively one of the rotation-preventing members.

8. The steering apparatus of claim 6, wherein the ECU is configured to, when the steering torque value is greater than the maximum reaction torque value, operate the driving motor so that one end of the long side of the cam member contacts one of the rotation-preventing members.

* * * * *